Jan. 28, 1964  I. BENTOV  3,119,283
POWER TRANSMISSION
Filed April 23, 1962  5 Sheets-Sheet 1

INVENTOR.
Itzhak Bentov
BY
P. L. Spencer
ATTORNEY

Jan. 28, 1964     I. BENTOV     3,119,283

POWER TRANSMISSION

Filed April 23, 1962     5 Sheets-Sheet 2

INVENTOR.
Itzhak Bentov
BY
C. L. Spencer
ATTORNEY

Jan. 28, 1964    I. BENTOV    3,119,283
POWER TRANSMISSION
Filed April 23, 1962    5 Sheets-Sheet 3

INVENTOR.
Itzhak Bentov

BY
*L. L. Spencer*
ATTORNEY

Jan. 28, 1964   I. BENTOV   3,119,283
POWER TRANSMISSION
Filed April 23, 1962   5 Sheets-Sheet 4

INVENTOR.
*Itzhak Bentov*
BY
*C. L. Spencer*
ATTORNEY

INVENTOR.
Itzhak Bentov
BY
C. L. Spencer
ATTORNEY

United States Patent Office 3,119,283
Patented Jan. 28, 1964

1

3,119,283
POWER TRANSMISSION
Itzhak Bentov, Belmont, Mass., assignor to General Motors Corporation, Detroit, Mich., a corporation of Delaware
Filed Apr. 23, 1962, Ser. No. 189,609
18 Claims. (Cl. 74—640)

This invention relates to a power transmitting device and more particularly to an infinitely variable drive structure constructed and arranged to provide a substantially constant output speed irrespective of variation of speed of rotation of a power input member.

The power transmitting device of the present invention is designed to be of simple, inexpensive construction and to be automatically operable to compensate for variation of input speed particularly in a speed range of from four hundred to four thousand revolutions per minute and to provide a substantially constant output speed for the above range of input speeds.

The power transmitting device includes the use of an expandable and contractable member together with centrifugal force responsive means for increasing the circumference of the expandable member to maintain a substantially constant output speed irrespective of variation in speed of rotation of a power input member.

The structure includes the use of a ring having a fixed circumference, a power input member, a roller support member driven by the power input member, an expandable and contractable endless assembly having a circumference less than the ring, rollers carried by the roller support member for maintaining the expandable assembly in non-slipping engagement with the ring, and additional rollers carried by the roller support member responsive to centrifugal force for expanding the endless assembly to maintain substantially constant output speed as the speed of rotation of the power input member increases.

An additional important feature of this invention is to provide means operative at relatively low speeds of rotation of the roller assembly to permit relatively large initial expansion of the expandable and contractable assembly and automatically operative upon increase in speed of rotation of the roller assembly to decrease the rate of expansion of the expandable and contractable assembly. This is accomplished by providing means effective to increasingly resist radial travel of the roller assembly as the rollers tend to move radially outwardly against the expandable and contractable assembly in response to centrifugal force acting on the roller assembly.

A further object of this invention is to provide in an assembly of the type described, torque transmitting means for transmitting torque from a power input member including an expandable unit, centrifugally responsive means for expanding the torque transmitting unit including a pair of members movable radially outwardly to expand said expandable torque transmitting unit, means for equalizing the radial outward travel of said pair of radially movable members, and to provide means for increasingly resisting radial outward travel of the pair of radially movable members as such members accomplish their radial movement, to compensate for the increased centrifugal force effect of such radially movable member

2 resulting from the increase in radius of said members as they move radially outwardly.

These and other objects and advantages of this invention will be apparent from the following description and claims, taken in conjunction with the accompanying drawings, in which:

Figure 1:
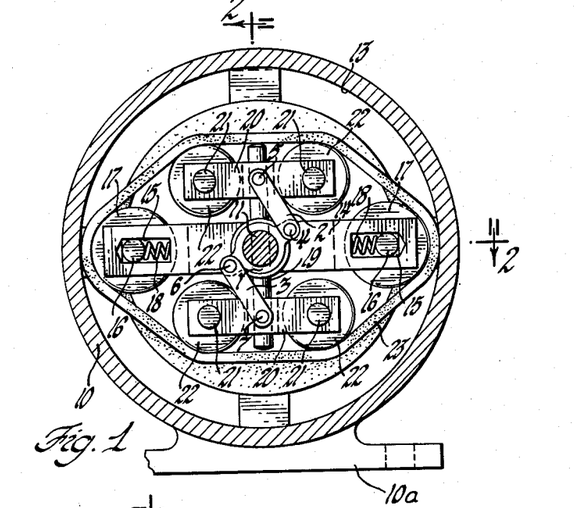
FIGURE 1 is a section through a first embodiment of the invention.
Figure 2:
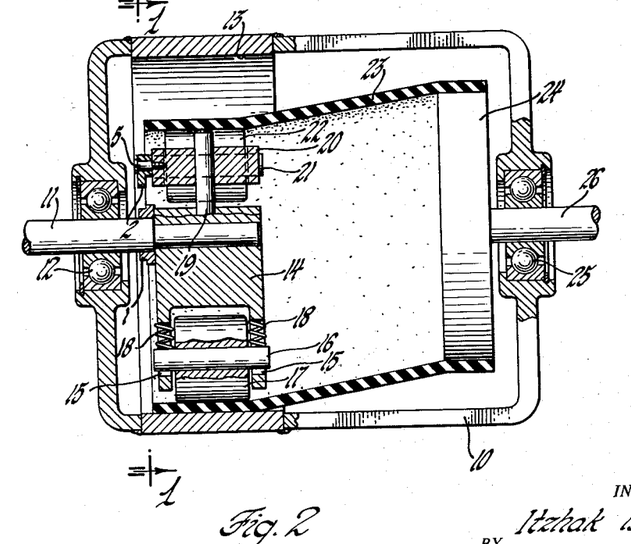
FIGURE 2 is a sectional view taken along the line 2—2 of FIGURE 1.

Referring to FIGURES 1 and 2, there is shown a first structural assembly incorporating the principles of this invention. A nonrotatable housing 10 supported by a suitable foot or support member 10a supports a power input shaft 11 therein by means of a bearing 12. Shaft 11 may be driven at variable speeds through a wide speed range, for example, four hundred to four thousand revolutions per minute, by a variable speed power source, not shown. An internal cylindrical surface 13 of a predetermined circumference is fixed to and held against rotation by housing 10. A power delivery shaft 26 supported in a bearing 25 in housing 10 is driven by a disc 24 fixed to shaft 26 and fixed to a connector 23 so that connector 23, disc 24 and shaft 26 rotate as a unit. Connector 23 comprises an endless member such as a belt formed of expandable material. In its unexpanded or normal condition, the circumference of connector 23 is less than that of cylindrical surface 13.

Power input shaft 11 drives a yoke 14 having slots 15 therein adapted to receive pins 16, each pin supporting a roller 17 thereon. Springs 18 seat in yoke 14 to bias pins 16 to force rollers 17 radially outwardly from the axis of rotation to maintain connector 23 in nonslipping frictional engagement with cylindrical surface 13. A support member in the form of a pin 19 extends outwardly from the opposite sides of yoke 14 at an angle of 90 degrees to the yoke as best shown in FIGURE 1. A pair of centrifugal roller assemblies are slidably supported on pin 19 at opposite sides of yoke 14 for movement with respect to pin 19 in response to change of centrifugal force. Each centrifugal roll assembly includes a roller support arm 20 slidable on pin 19. Each support arm carries a pair of rollers 22 supported on individual pins 21 which extend through the support arm. Equalizing mechanism including a ring 1 rotatable with respect to shaft 11, and equalizing arms 2 and 3 is provided to equalize the radial outward movement of the centrifugal roll assemblies in response to increase of centrifugal force. Equalizer arm 2 is connected to ring 1 by means of a pin 4 and to one of the centrifugal roll assemblies by means of a pin 5. Equalizer arm 3 is connected to ring 1 by means of a pin 6 and to the arm 20 of the other centrifugal roll assembly by means of a pin 7.

In operation of the arrangement of FIGURES 1 and 2 it will be understood that the flexible connector 23 is held in nonslipping frictional engagement with surface 13 of housing 10 and that rotation of power input shaft 11 and yoke 14 and consequent rotation of rollers 17 will cause connector 23 to walk around internal cylindrical surface 13, the surface 13 forming a reaction surface fixed against rotation. At relatively low speeds of rotation of shaft 11, the support yokes 20 and the rollers 22 carried thereby will be unable to apply sufficient force to the internal surface of connector 23 to stretch or expand the connection. The circumference of connector 23 will therefore be minimum. The initial speed ratio is expressed as the circumference of the outer ring (surface 13) minus the circumference of connector 23 divided by the circumference of connector 23. As the speed of rotation of shaft 11 increases, yokes 20 and rollers 22 are moved radially outwardly on pin 19 by centrifugal force to apply force to the inner surface of connector 23, thereby expanding or stretching the connector to increase its circumference. The top speed ratio may be expressed as the circumference of surface 13 minus the circumference of connector 23 in its maximum stretched position divided by the circumference of the connector 23 in its maximum stretched position. At all speeds in between, the speed ratio will be proportional to the circumference of the connector, which is determined by the force applied thereto by the movable rollers and results from centrifugal force applied by the rollers.

The equalizing linkage whereby the two sets of rollers are connected to each other prevents one set of rollers from moving outwardly on pin 19 prior to such motion by the other set of rollers as might occur in the absence of such linkage. By equalizing the movement of the two sets of rollers on pin 19, better control in stretching the connector, and longer connector life is achieved since localized stretching of the belt by only one set of rollers is prevented. The two sets of rollers 21 at opposite sides of yoke 14 and the two rollers 17 at opposite ends of yoke 14 further provide dynamic balance of the assembly at high rotating speeds.

It will be apparent that as the speed of input shaft 11 is increased, the centrifugal force effect of rollers 22 expands the connector 23 to increase its circumference to a sufficient length to maintain the speed of rotation of shaft 26 substantially constant. If we assume that the circumference of surface 13 is 1.25 times that of connector 23 in the initial unstretched condition of the connector, then the initial speed ratio will be 1.25 minus 1 divided by 1, which equals .25 or 1 to 4. The more the circumference of connector 23 is increased, the closer it approaches that of surface 13, and the greater is the speed ratio. For example, if the circumference of connector 23 is increased to a condition where the circumference of surface 13 is only 1.025 times the circumference of connector 23, then the drive ratio becomes .025 divided by 1 or 1 to 40. As the speed of input shaft 11 varies, either by increase or decrease of speed, the expansion or stretch of the expandable member 23, and therefore its circumference, varies to change the speed ratio of the assembly to permit output shaft 26 to be driven at a substantially constant speed throughout a wide range of input speed, for example, 4,000 to 16,000 r.p.m. The assembly is automatically self governing for substantially constant speed output.

In the foregoing explanation of the operation it has been assumed that the expansion of the circumference of belt 23 is directly proportional to increase in centrifugal force applied thereto by the rollers and that the centrifugal force varies directly with changes in speed of rotation of shaft 11. In actual practice, the centrifugal force applied varies as a function of the square of the radius or distance from shaft 11 to the center line of support 20 along pin 19. Belt 23, on the other hand behaves in a linear manner. Initially support 20 and rollers 22 are close to shaft 11 and the circumference of belt 23 is minimum, the belt being unstretched. As the input speed to the device increases, the roller support 20 and rollers 22 will move radially outwardly on pin 19, stretching belt 23 to increase the circumference of the belt. Since the centrifugal force applied to the belt by the rollers 22 is proportional to the square of the radius of the center line of support 20 from the center line of shaft 11, and since belt 23 behaves in a linear manner, the output speed of the device is not absolutely constant irrespective of increase of input shaft speed, but is approximately so, within a range of 20%. The device is utilized in relatively high input speed range of 4,000 to 16,000 r.p.m. and is highly useful irrespective of the deviation from absolute constant output speed. As hereafter more particularly explained, means may be incorporated to oppose this increase in rate of expansion to provide for initial rapid expansion of member 23 at relatively low input speeds and to decrease its rate of expansion as the input speed increases in higher input speed ranges.

Figure 3:
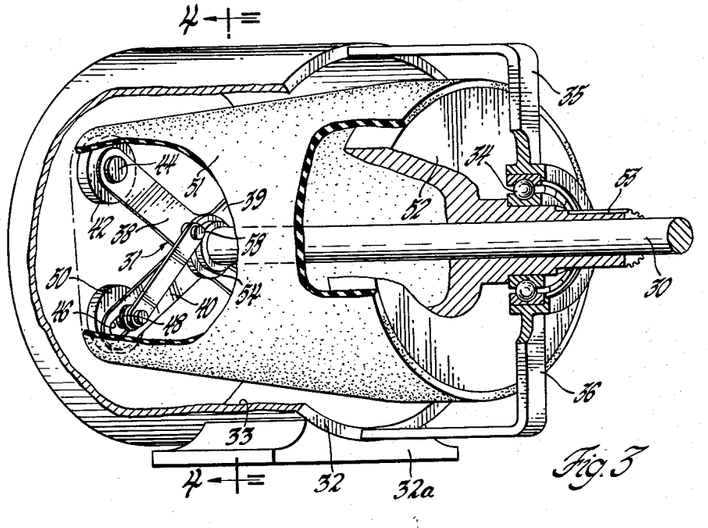
FIGURE 3 is a perspective view with parts cut away of a second embodiment of the invention.
Figure 4:
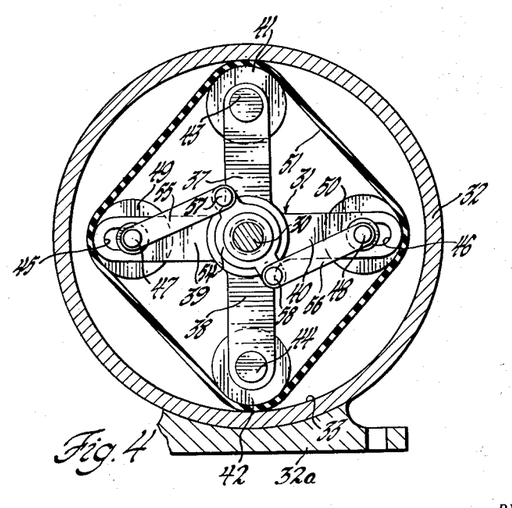
FIGURE 4 is a sectional view taken along the line 4—4 of FIGURE 3.

In FIGURES 3 and 4 there is shown an alternate embodiment of the invention wherein the centrifugal force responsive or stretching rollers are mounted upon flat arms rather than pins and wherein the power input and power output are at the same end of the assembly as distinguished from the first embodiment wherein the power input is located at one end of the assembly and power delivery is at the opposite end of the assembly.

A power input shaft 30 adapted to be driven at variable speeds of rotation throughout a predetermined speed range, for example, 4,000 to 16,000 r.p.m., extends through a disc 52 to drive a yoke 31 having four arms 37, 38, 39 and 40 thereon. A stationary nonrotatable housing 32 held against rotation by a suitable foot or support member 32a, is shaped to form a cylindrical reaction surface 33 of a fixed circumference. A roller bearing 34 carried by support arms 35 and 36 fixed to housing 32 supports the rotatable assembly for rotation. An expandable member 51 is fixed for rotation with disc 52 as is an axially extending power delivery sleeve 53. This shaft 30 is rotatably supported in sleeve 53 and sleeve 53 in turn is rotatably supported by bearing 34.

Expandable connector 51 in its unstretched condition forms an endless belt having a circumference less than that of cylindrical surface 33. A first pair of rollers 41, 42 rotatably supported on pins 43, 44, respectively, carried by arms 37, 38, respectively, of yoke 31, press the member 51 into non-slipping friction contact with surface 33 without stretching the member 51. Arms 39 and 40 are provided with slots 45 and 46 to receive pins 47 and 48 which, in turn, support rollers 49 and 50, respectively, thereon. As will be apparent, slots 45 and 46 permit pins 47, 48 and rollers 49, 50 to move radially outwardly to expand member 51 as the speed of rotation of shaft 30 and yoke 31, driven by shaft 30, increases. As the circumference of connector member 51 increases due to expansion of the member 51 due to the force applied thereto by rollers 49 and 50, the drive ratio of the assembly changes to maintain a substantially constant speed of rotation of power delivery sleeve 53 irrespective of increase of speed of rotation of power input shaft 30. Equalizing mechanism for equalizing the radial travel of rollers 49, 50 comprises a ring 54 rotatable with respect to shaft 30 and connected to pins 47 and 48 respectively, by means of equalizer arms 55 and 56, respectively carried by pins 57 and 58. In the embodiment shown in FIGURES 3 and 4, the radius of the axis of rotation of pins 43, 44 from the axis of rotation of shaft 30 and the diameter of rollers 41, 42 are chosen such that the rollers 41, 42 press the member 51 into non-slipping engagement with surface 33 without requiring springs equivalent to springs 18 of FIGURES 1 and 2. The operation of the arrangement in FIGURES 3 and 4 is similar to that of FIGURES 1 and 2.

In the embodiments illustrated in FIGURES 1 through 4 the expandable connector is illustrated as comprising an endless rubber belt which may be expanded to increase its circumference by action of outward radial movement of the centrifugally responsive rollers. The endless belt need not, however, be limited to rubber but may be formed of any readily expandable and contractable material adapted to be stretched and capable of returning to its original circumference after the forces tending to expand the material have been removed. If desired, suitable means (not shown) may be provided whereby outward radial movement of rollers 49 and 50 may be increasingly opposed as the rollers tend to travel outwardly in response to increase in speed of rotation. As heretofore explained, it may be desirable to provide for initial rapid expansion of member 51 at relatively low input speed ranges and to decrease the rate of expansion of member 51 at relatively higher speed ranges. This might be accomplished, for example, by inserting short springs (not shown) in slots 45 and 46 between the pins 47 and 48 and the outer ends of the slots. At relatively low input speeds the rollers 49 and 50 would be permitted limited radial motion against the resistance of belt 51 before the pins would contact the springs. This would provide a relatively rapid initial rate of expansion of belt 51 at such low input speeds. As the pins move outwardly in response to increased input speed the pins would at some point contact the springs whereupon an increased resistance to further radially outward travel of the roller would result. The rate of expansion of belt 51 would be decreased in this input speed range due to action of the springs. The springs could be variable rate compound springs, if desired, so that the resistance to outer movement of the rollers would increase as the rollers move outwardly.

Figure 5:
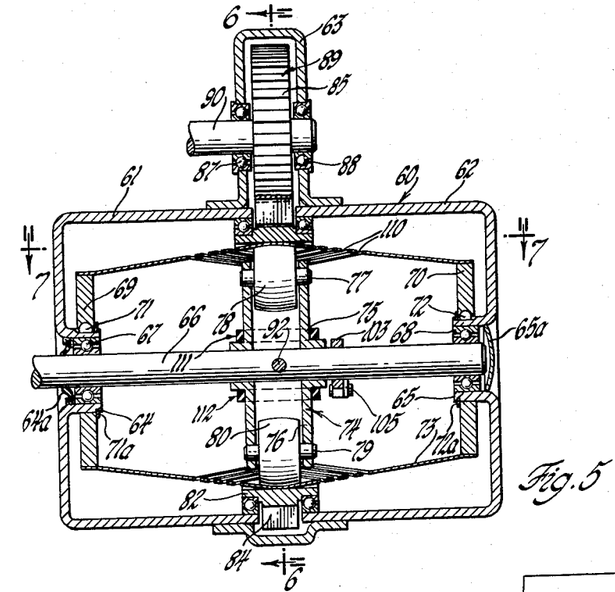
FIGURE 5 is a partially sectional view of a third embodiment of the invention.
Figures 6, 6A, 7:
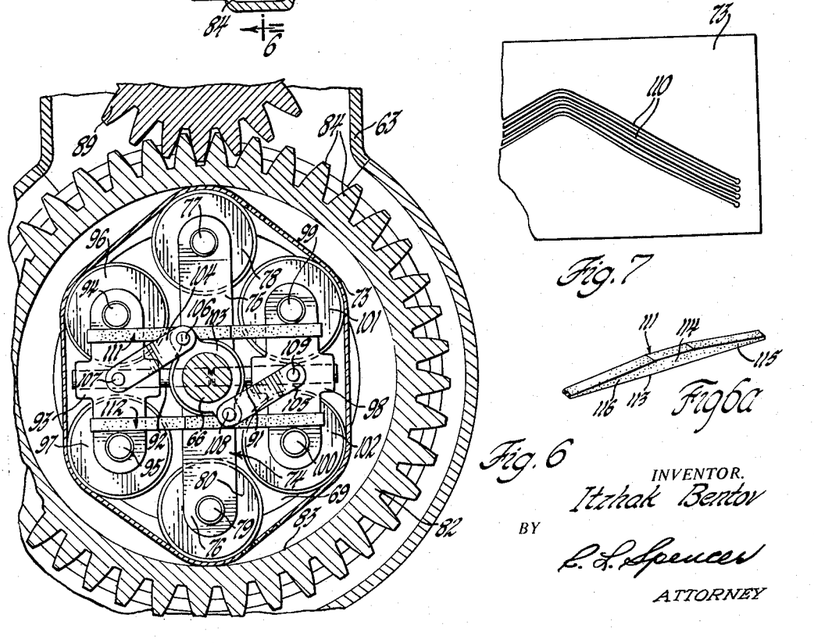
FIGURE 6 is a sectional view taken along the line 6—6 of FIGURE 5.
FIGURE 6A is a perspective view of a portion of an annular restraining member having non-linear stretch characteristics.
FIGURE 7 is a top plan view of the expandable torque transmitting member of FIGURE 5 illustrating the V-shaped slots cut through the member.

In FIGURES 5 through 7 there is shown a third embodiment of the invention wherein power input is through one end of the assembly and power take-off is intermediate the ends of the assembly. Further in these figures there is shown means for increasingly resisting radial outward movement of the stretch rollers as the speed of rotation of the rollers increases. This provides an initial rapid rate of expansion of the endless belt at low input speeds and a decrease in the rate of expansion of the belt as the input speed increases.

As shown particularly in FIGURE 5, a fixed nonrotatable housing 60 is formed of an assembly of two similar housing portions 61 and 62 formed of heavy stamped sheet metal and joined together by a power take-off housing 63 of sheet metal and welded or otherwise secured to housing portions 61 and 62 to retain the portions 61 and 62 in assembled relationship. Housing section 61 is shaped to provide an axially extending inwardly protruding hollow support boss 64 formed thereon and housing section 62 has a similar support boss 65 formed thereon. A power input shaft 66 is rotatably supported in roller bearings 67 and 68 disposed between the shaft 66 and the internal annular surfaces of bosses 64 and 65, respectively. A pair of end plates 69 and 70 each have central openings adapted to receive the external annular axially extending surfaces of bosses 64 and 65, the plate 69 and 70 being fixed to the bosses by keys 71 and 72 to be fixed against rotation and by snap rings 71a and 72a, respectively. A flexible expandable and contractable member 73 forming an endless belt has the opposite edges of the belt fixed to end plates 69 and 70 so that the belt is held against rotation. End plates 69 and 70 fit closely on the bosses 64 and 65 and are disposed directly radially outwardly from the bearings 67 and 68 to provide a strong rigid structure in the zone of the bearings. An end cap 65a is fitted into boss 65 to protect bearing 68 from foreign matter. A flexible seal 64a is fitted into boss 64 and contacts shaft 66 to protect bearing 67 and to prevent foreign matter from entering the assembly along shaft 66.

As best shown in FIGURE 6, power input shaft 66 drives a yoke indicated generally at 74 and having arms 75 and 76 extending therefrom, the arm 75 supporting a roller 78 thereon by means of a pin 77, and the arm 76 supporting a roller 80 thereon by means of a pin 79. Rollers 78 and 80 bear against the internal surface of an expandable connector 73 to press the external surface of member 73 into non-slipping friction engagement with an annular ring 82 having gear teeth 84 on the external surface thereof and an internal surface 83 of a fixed circumference which serves as the reaction member of the assembly. A final power delivery shaft 90 having a gear 89 fixed thereto is rotatably supported in housing 63 by means of bearings 87 and 88. Gear teeth 84 of gear 82 mesh with teeth 85 of gear 89 to drive the shaft 90. A pair of upstanding pins 91 and 92 extend radially outwardly from yoke 74 at 90 degrees to arms 75, 76, the pin 92 having a roller support member 93 slidably supported thereon and carrying pins 94 and 95 which support stretch rollers 96 and 97, respectively. Similarly the pin 91 carries a roller support member 98 slidable thereon and having pins 99 and 100 for rotatably supporting stretch rollers 101 and 102, respectively. A compensating or travel equalizing mechanism for equalizing the travel of roller supports 93 and 98 on their respective support pins comprises a ring 103 rotatable with respect to pins 91, 92 and connected to roller support 93 by a link 104 and to roller support 98 by a link 105. Link 104 is connected to ring 103 and to roller support 93 by pivot pins 106 and 107, respectively, while link 105 is connected to ring 103 and to roller support 98 by pivot pins 108 and 109, respectively. The equalizing linkage serves to assure equal radial travel of the centrifugally responsive stretch rollers so that the member 73 is stretched equally at opposite sides of the assembly.

In order to vary the rate of expansion of member 73, a pair of similar resilient bands 111 and 112 are mounted on the movable roller supports 93 and 98 as best shown in FIGURE 6. These resilient members, which oppose radial outward movement of roller supports 93 and 98 are formed of non-uniform cross section as best shown in FIGURE 6A. Each resilient band comprises an endless member similar to a common rubber band but is shaped to have a relatively thick section and a relatively thin section joined by sections of increasingly thinner sections beginning at the thickest section and progressing to the thinnest section. As shown in FIGURE 6A, a portion of one of the similar bands, 111, has a flat bottom surface 113 adapted to contact the roller carriers 93 and 98 in the assembly, a relatively thick section 114, the section 114 tapering uniformly to the thinnest portion of the band at opposite sides of the relatively thick section as indicated at 115, 116. While only a portion of the endless band is shown in FIGURE 6A, it will be understood that the resilient member 111 may be formed to have two such relatively thick and thin portions.

The endless bands 111 and 112 provide a force opposing radial outward travel of roller support members 93 and 98, the opposing force initially being small and increasing as radial outward motion of the roller supports occurs. Thus, at relatively low input speeds the relatively thin portions of the bands initially stretches to permit radial outward travel of the rollers and consequent relatively fast initial expansion of the circumference of member 73, in response to initial increase of input speed. With further increase of input speed, the relatively thin sections of the elastic bands 111 and 112 reach their elastic limit, whereupon the relatively thicker portions of the endless bands are stretched. It will be apparent therefore that the bands 111 and 112 initially permit relatively rapid radial motion of the stretch rollers and provide a force which increasingly resists radial outward motion of the rollers as the roller supports move radially outwardly on the pins 91 and 92.

This provides rapid initial stretch of connector 73 with consequent rapid initial change of drive ratio. As the speed of rotation of shaft 66 increases, the resistance to movement of supports 93 and 98 increases so that the rate of stretch of member 73 decreases. Thus, the rate of change of drive ratio is relatively high at low input speeds and decreases with increase of input speed. The bands 111, 112 compensate for the increase of centrifugal force effect of the movable roller assemblies which arises due to the fact that these assemblies are radially outwardly a greater distance from their center of rotation as the speed of rotation increases.

The expandable member 73 in the embodiment of FIGURES 5 through 7, is an endless belt, relatively wide and has V-shaped slots cut therethrough with the apex of the V in the zone contacted by the rollers. These slots contribute to the flexibility of member 73 which may be formed of metal. The circumference of the band 73 may be increased through action of the stretch rollers with satisfactory results so long as the elastic limit of the metal is not exceeded. The flexible connector 73 is fabricated of thin metal sheet which is stamped to form the series of slots 110 and the free ends are joined to form an endless belt.

In operation, in the embodiment shown in FIGURES 5 through 7, the member 73 is held against rotation by end plates 69 and 70 which are anchored to nonrotatable housing portions 61 and 62, respectively. Upon rotation of the roller assembly, gear 84 is caused to walk around member 73 at a drive ratio determined by the difference in circumference of member 73 and surface 83 in accordance with the formula heretofore set forth to drive gear 89. At low initial input speeds a relatively large rate of expansion of member 73 occurs with increase of input speed. At relatively higher input speeds, the rate of expansion of member 70 decreases due to the action of rubber members 111 and 112. The resistance force opposing outward travel of the stretch rollers provided by bands 111 and 112 is small at low input speeds and increases as input speed increases.

Figures 8, 9, 10, 11, 12:
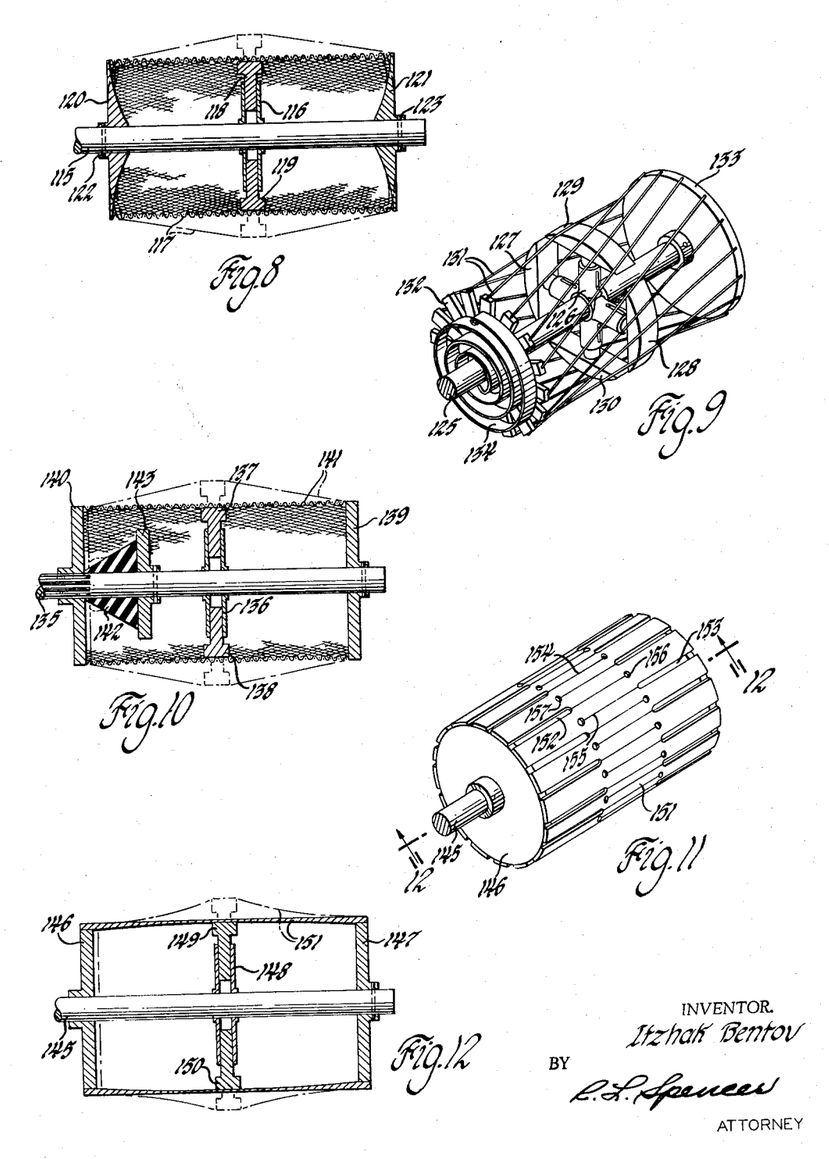
FIGURE 8 is a schematic diagram of a modified form of expandable torque transmitting member which includes a pair of variable constant cantilever springs for permitting initial rapid expansion of the torque transmitting member and for increasingly resisting expansion as expansion is accomplished.
FIGURE 9 is a schematic diagram of a further modified form of expandable torque transmitting member incorporating a constant force spring for permitting initial rapid expansion of the torque transmitting unit and for increasingly resisting expansion of the unit as expansion is accomplished.
FIGURE 10 is a schematic diagram of another form of expandable torque transmitting unit incorporating a non-linear rubber spring effective to permit initial rapid expansion of the torque transmitting unit and for increasingly resisting expansion of the unit as expansion is accomplished.
FIGURE 11 is a schematic diagram of yet another form of expandable torque transmitting unit including a variable thickness non-linear type of expandable belt constructed to permit initial rapid expansion of the belt and to progressively resist belt expansion as such expansion is accomplished.
FIGURE 12 is a sectional view taken along the line 12—12 of FIGURE 11.

In FIGURE 8 there is shown a schematic diagram of an alternative assembly which is arranged for power take-off intermediate the ends of the assembly with power input by means of a shaft 115 adapted to be driven at variable speeds. A yoke 116 carries a series of presser members (not shown) for pressing a torque transfer member 117 against a power output ring (not shown) in the manner illustrated in FIGURE 5. Yoke 116 also drives centrifugally responsive stretch members 118, 119, adapted to move radially outwardly in response to increase in speed of rotation of shaft 115 to stretch the member 117. A pair of spaced variable constant cantilever disc springs 120 and 121 are retained on shaft 115 by means of pins 122 and 123, respectively. Member 121 comprises a wire mesh cage and is illustrated in dotted lines in its fully expanded position. Cage 117 is fixed to the outer periphery of each of the annular surfaces of the variable constant cantilever springs. It will be apparent that due to the shape of the cantilever springs, the springs being relatively thick adjacent shaft 115 and decreasing in thickness progressively in the direction of the outer periphery thereof, that springs 120, 121 will initially deflect towards each other with relatively light force applied to screen 117 by centrifugal members 118, 119. However, after initial deflection, a greater resistance to further deflection will be afforded by springs 120, 121 as the speed of rotation of members 118, 119 increases. Springs 120, 121 are calibrated to provide an increasing rate of resistance to radial outward travel of members 118, 119 as the members move radially outwardly to compensate for and counteract the increased centrifugal force effect of members 118, 119 which results from the radial outward motion of these members with respect to their axis of rotation.

In FIGURE 9 an alternate form of compensating mechanism which initially provides very little resistance to radial outward motion of the radially movable weights is shown. A power input shaft 125 drives a yoke 126 which supports presser members 127, 128 and radially movable stretch members 129, 130. A series of expandable members 131 extend between and are fixed to supports 132, 133. End support 133 is pinned to shaft 125. End support 132 is capable of limited angular rotation with respect to shaft 125 and is connected thereto by a constant force spring 134, one end of the spring being fixed to end support 132 and the other end to shaft 125. At relatively low input speeds, spring 134 offers little resistance to outward radial travel of the members 129, 130. As the members travel radially outwardly due to increase of speed of rotation of shaft 125, member 132 will rotate slightly with respect to shaft 125, the spring 134 being wound up by such rotation to increasingly resist rotation as the weights 129, 130 move outwardly.

In FIGURE 10 an additional modification for increasingly resisting radial outward motion of the stretch weights is schematically shown. A power input shaft 135 adapted to be driven at variable speeds drives a yoke 136 having stretch weights or rollers 137, 138 adapted to move radially outwardly in response to centrifugal force and presser weights (not shown) supported thereon. An end plate 139 is fixed to shaft 135 for rotation therewith and an end plate 140 is splined to shaft 135 for rotation therewith and for axial motion with respect to shaft 135. Weights or rollers 137, 138 move outwardly against a wire cage 141 in response to increase in speed of rotation of shaft 135 to increase the circumference of the cage. A non-linear rubber spring 142 of generally cone shaped configuration is carried by shaft 135, the base of member 142 being seated upon a backing member 143 fixed to shaft 135 and the narrow end or apex of the cone contacting the end plate 140. Non-linear rubber spring 142 serves to provide very limited resistance to initial stretch of wire cage 141 at low speed of rotation of shaft 135.

As the speed of shaft 135 increases, non-linear resilient member will increasingly resist axial motion of end plate 140 to provide increasing resistance to stretch of cage 141. The effect of cone 142 is calibrated to compensate for the increase in centrifugal force effect of members 137, 138 which arises due to their radial motion away from their axis of rotation as the speed of shaft 135 increases.

A further embodiment incorporating means to compensate for the centrifugal force effect of the stretch rollers or weights is shown in FIGURES 11 and 12. A power input shaft 145 adapted to be driven at variable speeds drives a pair of spaced discs 146, 147 and a yoke 148. Yoke 148 supports press rollers (not shown) and supports stretch rollers 149 and 150 adapted to move radially outwardly against a non-linear collect type variable thickness connector 151 fixed to discs 146, 147, respectively. Connector 151 varies in thickness uniformly from the center point axially intermediate discs 146, 147 and is formed of sheet metal. The thinnest portion of the sheet metal is at the zone of contact of stretch rollers 149, 150 and the thickest portion of the metal is at the area of contact of discs 146, 147. As best shown in FIGURE 11, connector 151 is provided with a series of spaced gaps 152, 153 at opposite sides axially of the zone of contact of stretch rollers 149, 150. The metal of member 151 is further slotted axially across the zone of contact of rollers 149, 150 in the area of relatively thin metal as shown at 154, 155. Stress relief holes 156, 157 are drilled through the metal at the dead ends of slots 154 and 155. As shown, each of the series of air gaps 153, slots 155 and stress relief holes 157 are out of alignment with gaps 152, slot 154 and stress relief hole 156, there being a relatively wide section of sheet metal between the adjacent gaps 152 and the adjacent gaps 153 at axially opposite sides of the zone of contact of stretch rollers 149—150, in the zone of relatively thick metal. The air gaps and slots provide adequate flexibility to the sheet metal and enable the metal to be stretched by stretch rollers 149, 150. The variation of thickness of the sheet metal enables initial stretch of the metal at low input speed and provides increasing resistance to stretch of the metal as the input speed increases. This compensates for the increase in centrifugal force effect of rollers 149, 150 which arises due to their radial outward movement from their axis of rotation.

In the schematic embodiments of FIGURES 8 through 12, although only the stretchable connector and not the cylindrical member of fixed circumference has been shown, it will readily be understood that the stretchable connector will be forced into non-slipping friction engagement with a cylindrical surface of fixed circumference greater than that of the connector by press rollers and that the function of the stretch rollers is to increase the circumference of the connector in response to increase of speed of rotation of the input shaft.

Figure 13:
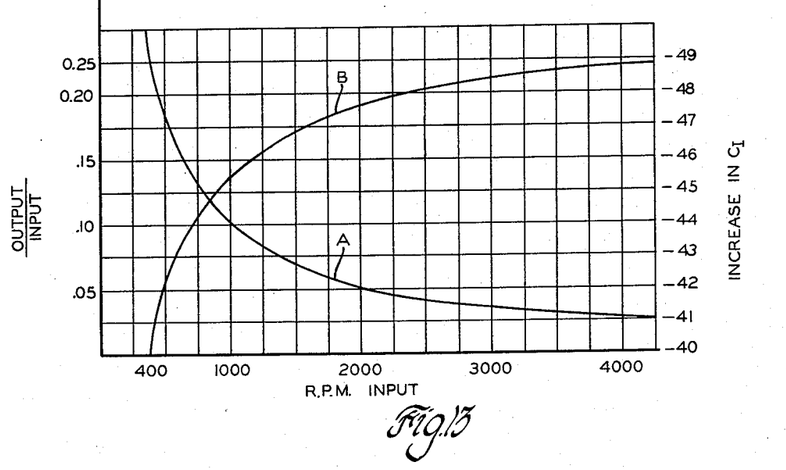
FIGURE 13 shows a set of curves illustrating the desired output to input ratio and the desired increase in circumference of the expandable torque transmitting member necessary to provide the desired output to input ratio for obtaining constant speed output at various input speeds.

Referring to FIGURE 13 there is shown a curve A and a curve B. If we assume that a steady output speed of 100 r.p.m. is desired and that the input r.p.m. varies between 400 and 4000 r.p.m., curve A represents the desired output to input ratio for a belt having a variable spring constant such as illustrated in FIGURES 6 through 12. If we assume that the circumference of the non-stretchable member has a circumference of 50 cm., and that the initial circumference of the stretchable connector member is 40 cm. and the maximum circumference of the connector in its maximum stretched condition is 49 cm., curve B represents the desired increase in the circumference of the stretchable connector at the various input speeds in order to obtain the speed ratios represented in curve A. In applications where great accuracy of output speed is desired, it is necessary to compensate for the increased centrifugal force effect of the stretch rollers which arises due to the increase in radius of rotation of the rollers as the input speeds increase. The various compensating arrangements shown in FIGURES 6 through 12 may be employed to provide a structure wherein the increase in circumference of the stretchable connector conforms to curve B. If this degree of accuracy is not required and the output speed need not be constant, for example, 100 r.p.m., the compensating mechanism may be omitted. However, for constant speed output, means must be provided which initially provides little resistance to stretch of the belt connector at low input speed and which increasingly provides increasing resistance to the action of the stretch rollers as they move radially outwardly from their axis of rotation with increase of input speed.

Figure 14:
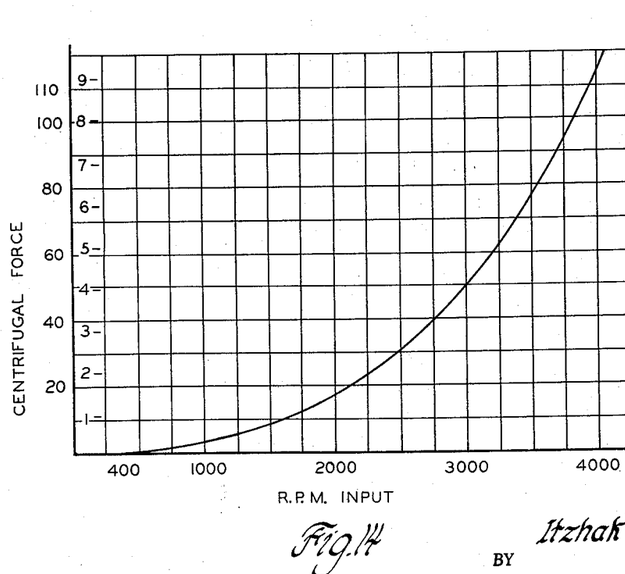
FIGURE 14 is a curve illustrating the centrifugal force required to be developed by the stretch members to increase the circumference of the torque transmitting member the desired amount necessary for constant output speed at various input speeds.

FIGURE 14 is a curve representing the increase in circumference of the stretchable connector, wherein the unstretched is 40 cm. and the fully stretched circumference is 49 cm.; and the centrifugal force applied to the belt to achieve the increase in circumference at each speed as the input speed increases from an initial input speed of 400 to a final input speed of 4000 r.p.m. The numbers 1 through 9 represent increase in belt circumference from initial circumference of 40 cm. to final circumference of 49 cm. The centrifugal force applied to the belt of linear spring constant at the various input speeds to give a corresponding increase in belt circumference is expressed in kilograms.

In the embodiments shown in FIGURES 1 through 4, the belt, in its stretching action behaves in a linear manner, whereas the stretch rollers develop centrifugal forces tending to stretch the belt which are proportional to the square of the radius of the roller axis of rotation from the axis of rotation of the power input shaft. In the absence of any means for compensating for the increase in centrifugal force arising from the radial outward movement of the rollers, the belt stretch will be of a non-uniform nature. The compensating means shown in FIGURES 5 and 6 may be employed in the structure of FIGURES 1–4 if desired. As shown in FIGURES 8 through 10 different compensating means have been added to compensate for the increased centrifugal force effect of the rollers caused by their increased radius of rotation as input speed increases. In FIGURES 11 and 12 the belt itself is designed to act as a non-linear spring to permit initial rapid belt expansion at low input speeds and to increasingly resist belt expansion as the input speed increases to compensate for the increase in centrifugal force of the stretch rollers caused by radial outward motion of the rollers.

In FIGURES 5 and 6 the annular bands 111 and 112 are formed of rubber of non-linear cross section to provide non-linear spring means for permitting initial rapid expansion of the torque transmitting unit and to increasingly resist expansion of the unit 73 as expansion occurs. In FIGURE 8, the cantilever springs 120—121 are formed of non-linear cross section and constitute non-linear spring means for opposing expansion of torque transfer member 117. In FIGURE 9, the spring 134 increasingly opposes expansion of the torque transfer member composed of the assembly of wires 131. In FIGURE 10, the non-linear rubber member 142 comprises a non-linear spring for increasingly opposing expansion of the wire mesh torque transfer member 141. In FIGURE 12 the torque transfer member 151 is formed of non-uniform cross section and functions as a non-linear spring to increasingly oppose expansion of member 151 as expansion occurs. In all embodiments the expandable torque transfer unit comprises an endless unit whether it comprises a belt as shown in FIGURES 1–6, a wire mesh as shown in FIGURES 8 and 10, an assembly of individual wires as shown in FIGURE 9, or a metallic sheet metal member as shown in FIGURES 11 and 12.

What is claimed is:

1. A transmission comprising a power input member adapted to be driven at variable speeds of rotation, a power delivery member, means for transmitting torque from said power input member to said power delivery member including; an endless expandable and contractable torque transmitting member, means forming a cylindrical reaction surface adapted to be contacted by said torque transmitting member, means including a roller driven by said power input member for maintaining said torque transmitting member in non-slipping friction contact with said cylindrical surface, and means including a second roller driven by said power input member for expanding said torque transmitting member as the speed of rotation of said power input member increases.

2. A power transmitting device comprising a power input member, a final power delivery member, means for transmitting torque from said power input member to said final power delivery member including; an endless expandable and contractable member, a ring member presenting a cylindrical reaction surface adapted to be contacted by the external surface of said expandable and contractable member, means including a roller rotated by said power input member for maintaining the external surface of said expandable and contractable member in non-slipping friction contact with said ring member, and additional means including a second roller rotated by said power input member effective to expand said expandable and contractable member upon increase in speed of rotation of said power input member.

3. A power transmitting device comprising a power input member adapted to be driven at variable speeds of rotation, a power delivery member, means for transmitting torque from said power input member to said power delivery member including; an endless expandable and contractable member, means forming a cylindrical reaction surface adapted to be contacted by said endless member, means for maintaining said endless member in non-slipping friction contact with said cylindrical surface, and a roller driven by said power input member movable in response to centrifugal force to expand said endless member upon increase in speed of rotation of said power input member.

4. A power transmitting device comprising a power input member, a yoke driven by said power input member, a final power delivery member, means for transmitting torque from said power input member to said final power delivery member including; an endless expandable torque transmitting member, means forming a cylindrical reaction surface, a roller carried by said yoke and pressing said endless torque transmitting member into non-slipping friction contact with said cylindrical surface, an additional roller carried by said yoke and contacting said endless torque transmitting member, said additional roller being movable in response to rotation of said yoke to expand said endless torque transmitting member to increase the circumference thereof.

5. A power transmitting device comprising a power input shaft adapted to be rotated at variable speeds of rotation, a final power delivery member, means for transmitting drive from said shaft to said final power delivery member including; an expandable endless belt, means forming a cylindrical reaction surface, means for maintaining said endless belt in non-slipping frictional contact with said cylindrical surface, and means driven by said shaft contacting said belt and movable in response to centrifugal force to expand said belt to increase the length of said belt in response to increase in speed of rotation of said shaft.

6. A power transmitting device comprising a power input shaft adapted to be driven at variable speeds of rotation, a power delivery member, means for transmitting torque from said shaft to said power delivery member including; an endless sub-assembly adapted to be expanded, means forming a cylindrical reaction surface, a first roller driven by said shaft effective to maintain said endless sub-assembly in non-slipping friction engagement with said cylindrical surface, and a second roller driven by said shaft movable radially outwardly from the axis of rotation of said shaft and effective to expand said endless sub-assembly to increase the length thereof in response to increase in speed of rotation of said shaft.

7. A power transmitting device comprising a power input shaft, a power delivery member, means for transmitting torque from said power input member including; an endless torque transmitting member formed of expandable and contractable material, said power input shaft extending into the interior of said endless member, means forming a cylindrical reaction surface exterior of said endless member, means for maintaining said endless torque transmitting member in non-slipping frictional contact with said cylindrical surface, and additional means driven by said shaft and disposed within said endless torque transmitting member for expanding said torque transmitting member to increase the length thereof in response to increase in speed of rotation of said shaft.

8. A power transmitting device comprising a power input shaft adapted to be driven at variable speeds of rotation, a power delivery member, means for transmitting torque from said shaft to said power delivery member including; an endless member adapted to be expanded from a normally contracted condition, said power input shaft extending into the interior of said endless member, means forming a cylindrical reaction surface exterior of said endless member, the circumference of said cylindrical surface being greater than the length of said endless member, a support member disposed within said endless member and driven by said power input shaft, a roller carried by said support member normally effective to maintain the external surface of said endless member in non-slipping friction contact with said cylindrical surface, and an additional roller carried by said support member, said additional roller being movable radially outwardly against said endless member to expand said endless member to thereby increase the length of said endless member in response to increase in speed of rotation of said power input member.

9. A constant speed power transmitting device comprising a power input member adapted to be driven at variable speeds of rotation, a power delivery member, means for transmitting torque from said power input member to said power delivery member including; an endless member adapted to be expanded from a normally contracted condition, means forming a reaction surface, means driven by said power input member for pressing said endless member into non-slipping friction contact with said reaction surface without expanding said endless member, additional means driven by said power input member movable in response to increase in speed of rotation of said power input member to apply a force to said endless member to expand said endless member as the speed of rotation of said power input member increases, and spring means for increasingly opposing the force effect of said movable means as the speed of said power input member increases.

10. A constant speed power transmitting device comprising a power input shaft, a power delivery member, means for transmitting power from said shaft to said power delivery member including; an endless belt adapted to be expanded from a contracted condition to vary the length of said belt, means forming a reaction surface of greater circumference than the length of said belt in its contracted condition, a support member driven by said shaft, a roller carried by said support member effective to maintain said belt in non-slipping frictional contact with said reaction surface, an additional roller carried by said support member and movable in response to increase in speed of rotation of said power input shaft to expand said belt to increase the length of said belt to maintain the speed of rotation of said power delivery member substantially constant irrespective of increase in speed of rotation of said power input shaft.

11. A constant speed power transmitting device comprising a power input shaft adapted to be driven at variable speeds of rotation, a power delivery member, means for transmitting power from said shaft to said power delivery member including; an endless member adapted to be expanded from a contracted condition to vary its length, means forming a reaction surface having a circumference greater than the length of said endless member in its contracted condition, a support member driven by said shaft, means carried by said support member for maintaining said endless member in non-slipping friction contact with said reaction surface, means movable in response to increase in speed of rotation of said input shaft to expand said endless member to increase the length of said endless member, and means effective to permit initial rapid expansion of said endless member at relatively low speeds of rotation of said input shaft and to increasingly decrease the rate of expansion of said endless member as the speed of rotation of said input shaft increases.

12. A constant speed power transmitting device comprising a power input shaft adapted to be driven at variable speeds of rotation, a power delivery member, means for transmitting power from said shaft to said power delivery member including; an endless member adapted to be expanded from a contracted condition to vary its length, means forming a reaction surface having a circumference greater than the length of said expandable member in its contracted condition, a support yoke driven by said input shaft, means carried by said support yoke for maintaining said endless member in non-slipping friction contact with said reaction surface, additional means carried by said support member and movable radially outwardly with respect to said support member in response to increase in speed of rotation of said input shaft to expand said expandable member to increase the length thereof, and means effective to permit initial rapid expansion of said expandable member at relatively low speeds of rotation of said input shaft, said last-mentioned means being increasingly effective to oppose radial outward movement of said radially movable means to decrease the rate of expansion of said expandable member as the speed of rotation of said input shaft increases.

13. A constant speed power transmitting device comprising a power input shaft adapted to be driven at variable speeds of rotation, a power delivery member, means for transmitting torque from said shaft to said power delivery member including; an endless member adapted to be expanded from a contracted condition to vary its length, means forming a reaction surface of greater circumference than the length of said expandable member, means driven by said power input shaft for maintaining said expandable member in non-slipping friction contact with said reaction surface, additional means driven by said power input shaft movable in response to centrifugal force to expand said expandable member to increase the length thereof, and means for opposing the centrifugal force effect of said additional means effective to permit initial rapid expansion of said expandable member at relatively low input shaft speeds and to increasingly oppose the centrifugal force effect of said additional means to decrease the rate of expansion of said expandable member as the speed of rotation of said input shaft increases.

14. A constant speed power transmitting device comprising a power input shaft adapted to be driven at variable speeds of rotation, a power delivery member, means for transmitting torque from said shaft to said power delivery member including; an endless member adapted to be expanded from a retracted to an expanded condition to vary its length, a ring forming a reaction surface having a circumference greater than the length of said expandable member in the unexpanded condition of said unexpanded member, means driven by said input shaft for maintaining said expandable member in non-slipping frictional contact with said reaction surface, a pair of radially movable members driven by said input shaft adapted to move radially outwardly with respect to said input shaft in response to increase in speed of rotation of said input shaft to expand said expandable member, means for equalizing the radial motion of said movable members, and means for providing a non-linear force acting to oppose radial outward motion of said radially movable members, said last-mentioned means being effective to permit rapid initial expansion of said expandable member at relatively low speeds of rotation of said input shaft and to progressively increasingly oppose radial outward travel of said movable members as the speed of rotation of said input shaft increases.

15. A power transmitting device comprising a power input member adapted to be driven at variable speeds of rotation, a power delivery member, means for transmitting torque from said power input member to said power delivery member including; an endless unit formed of expandable material, a ring presenting a reaction surface, the circumference of said reaction surface being greater than the length of said endless unit, means disposed within said expandable unit for maintaining the surface of said expandable unit in non-slipping friction engagement with said reaction surface, centrifugal force responsive means disposed within said endless unit driven by said power input member and movable radially outwardly with respect to the axis of rotation of said power input member to increase the length of said endless unit upon increase in speed of rotation of said power input member, and means for increasingly opposing radial outward movement of said centrifugal force responsive means as said centrifugal force responsive means moves radially outwardly.

16. A transmission comprising a power input shaft adapted to be driven at variable speeds of rotation, a power output shaft, an annular ring presenting a reaction surface, means for transmitting torque from said power input shaft to said power output shaft including; an endless member formed of material adapted to be expanded, the circumference of said reaction surface being greater than the length of said endless member, means driven by said power input shaft and disposed within said endless member for maintaining said endless member in non-slipping friction engagement with said reaction surface, additional means driven by said power input shaft and disposed within said endless member for expanding said endless member to increase the length thereof in response to increase in speed of rotation of said input shaft, said additional means being movable radially outwardly from the axis of rotation of said input shaft in response to increase in speed of rotation of said shaft, and means for increasingly opposing such radial outward movement of said additional means as said additional means moves radially outwardly from said shaft to compensate for the increase in centrifugal force effect of said additional means arising from the radial outward motion of said additional means from its axis of rotation.

17. A power transmitting device comprising a power input shaft adapted to be driven at variable speeds of rotation, a power delivery member, means forming a reaction surface, means for transmitting torque from said input shaft to said output member including; an endless torque transfer member formed of material adapted to be expanded, the length of said torque transfer member being less than that of said reaction surface, a yoke driven by said input shaft, rollers carried by said yoke for pressing said torque transfer member into non-slipping friction engagement with said reaction surface, a second set of rollers driven by said yoke and movable radially outwardly from the axis of rotation of said input shaft to expand said torque transfer member upon increase in speed of rotation of said input shaft, and means for equalizing the radial outward motion of said second set of rollers.

18. A transmission comprising a power input member adapted to be driven at variable speeds of rotation, a power delivery member, means forming a reaction surface, means for transmitting torque from said input member to said output member including; an endless member formed of material adapted to be expanded, the length of said reaction surface being greater than that of said torque transmitting member, a yoke driven by said input member, rollers carried by said yoke for pressing said torque transfer member into non-slipping friction contact with said reaction surface, a second set of rollers carried by said yoke and movable radially outwardly with respect to said yoke in response to increase in speed of rotation of said yoke to increase the length of said torque transfer member, means for equalizing the radial outward movement of said second set of rollers, and means increasingly effective to oppose radial outward movement of said second set of rollers as said rollers move radially outwardly to compensate for the increased centrifugal force effect of said rollers due to the increase of radius of rotation of said rollers.

References Cited in the file of this patent

UNITED STATES PATENTS

| | | |
|---|---|---|
| 2,012,629 | Huppmann | Aug. 27, 1935 |
| 3,005,358 | Musser | Oct. 24, 1961 |
| 3,039,324 | Waterfield | June 19, 1962 |

FOREIGN PATENTS

| | | |
|---|---|---|
| 161,130 | Switzerland | Apr. 15, 1933 |
| 1,232,240 | France | Apr. 19, 1960 |